United States Patent [19]

Fajeau

[11] Patent Number: 4,793,964
[45] Date of Patent: Dec. 27, 1988

[54] SMALL NATURAL CIRCULATION PRESSURIZED WATER NUCLEAR REACTOR

[75] Inventor: Maurice Fajeau, Pertuis, France

[73] Assignee: Commissariat a l'Energie Atomique, Paris, France

[21] Appl. No.: 51,836

[22] Filed: May 19, 1987

[30] Foreign Application Priority Data

May 22, 1986 [FR] France ................................ 86 07300

[51] Int. Cl.$^4$ ............................................ G21C 15/26
[52] U.S. Cl. ......................... 376/294; 376/220;
   376/228; 376/233; 376/283; 376/293; 376/368;
   376/406; 376/909
[58] Field of Search ............... 376/220, 228, 283, 294,
   376/299, 406, 458, 233, 293, 368, 909

[56] References Cited

U.S. PATENT DOCUMENTS

| | | | |
|---|---|---|---|
| 3,151,034 | 9/1964 | Douglass, Jr. et al. | 376/406 |
| 3,245,879 | 4/1966 | Purdy et al. | 376/406 |
| 3,255,088 | 6/1966 | Sprague et al. | 376/406 |
| 3,262,820 | 7/1966 | Whitelaw | 376/294 |
| 3,276,965 | 10/1966 | Leyse . | |
| 3,290,222 | 12/1966 | Schoessow et al. . | |
| 3,293,138 | 12/1966 | Schulten | 376/458 |
| 3,367,839 | 2/1968 | Chinaglia | 376/406 |
| 3,578,564 | 5/1971 | Fletcher, III | 376/294 |
| 3,711,371 | 1/1973 | Cahill, Jr. | 376/294 |
| 3,840,431 | 10/1974 | Devin et al. | 376/406 |
| 4,472,348 | 9/1984 | Desfontaines | 376/228 |
| 4,618,471 | 10/1986 | Defaucheux et al. | 376/228 |

FOREIGN PATENT DOCUMENTS

| | | | |
|---|---|---|---|
| 0174380 | 3/1986 | European Pat. Off. . | |
| 1242631 | 8/1960 | France | 376/228 |
| 1414277 | 9/1965 | France . | |
| 1533997 | 6/1968 | France . | |
| 0195190 | 11/1984 | Japan | 376/406 |
| 1067081 | 5/1967 | United Kingdom | 376/406 |
| 1125758 | 8/1968 | United Kingdom | 376/299 |

*Primary Examiner*—Deborah L. Kyle
*Assistant Examiner*—Richard Wendtland

[57] ABSTRACT

A pressurized water nuclear reactor comprises a normally vertical main vessel externally duplicated by a confinement enclosure. The main vessel contains a simplified primary circuit essentially incorporationg the reactor core and an annular steam generator arranged in such a way that the circulation of water, pressurized once and for all during the sealing of the vessel, takes place by natural convection. All the auxiliary circuits, conventionally ensuring cooling on shut down of such a reactor are eliminated, said cooling being ensured by a special arrangement of the space formed between the vessel and the enclosure and by the fact that the latter is immersed in an external cooling liquid, no matter what the slope of the reactor. The shut down of fission reaction in the core is ensured by systems of absorbing elements and by the automatic displacement of part of the reflector in the case of a slope of the reactor.

12 Claims, 2 Drawing Sheets

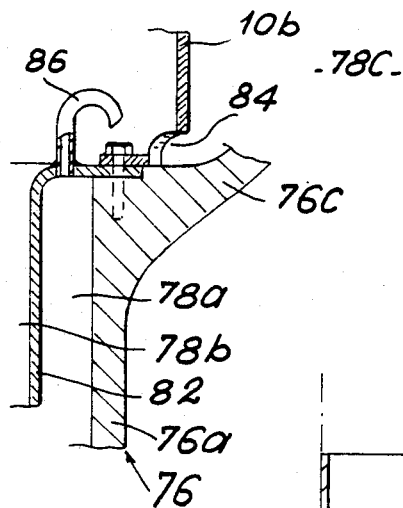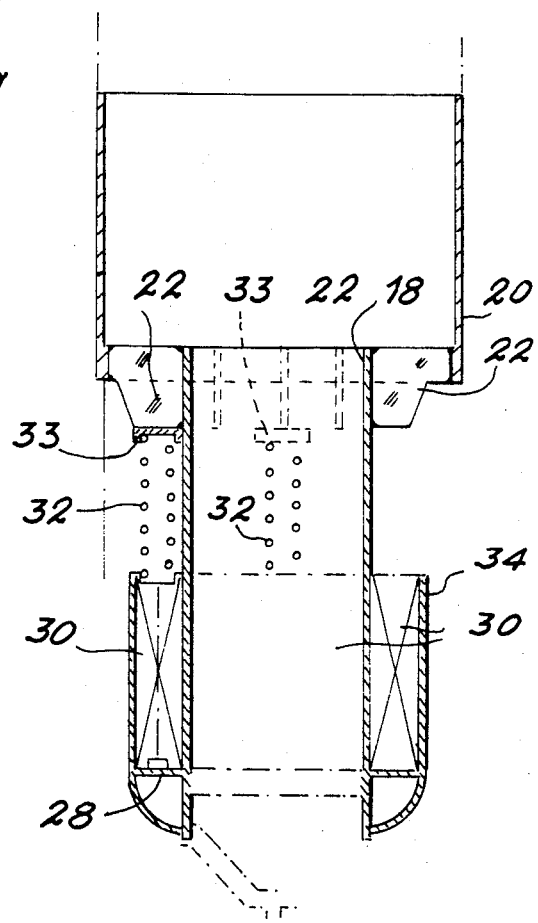

SMALL NATURAL CIRCULATION PRESSURIZED WATER NUCLEAR REACTOR

BACKGROUND OF THE INVENTION

The present invention relates to a small natural circulation pressurized water nuclear reactor of the calogenic or electrogenic type intended for local use. Such a reactor can be installed on an ocean drilling platform, or on a river or sheet of water, in an isolated region not having the electric power necessary for the operation of an industrial installation.

In view of these uses of a very particular type, such a reactor must be completely autonomous and transportable in a safe manner between a loading site, where its core is installed and its place of use. This reactor must also fulfil long term intrinsic safety conditions, preferably including the hypothesis of capsizing, because it has to be installed and transported at sea or on a river. Finally, the very local use of such a reactor makes it necessary for it to be constructed in a particularly simple manner, so as to reduce costs, increase reliability and simplify use thereof.

In the particular case of the nuclear propulsion of ships, small pressurized water nuclear reactors are already used. These reactors are generally derived by homothetic transformation from large pressurized water reactors. In particular, they still have pumps for circulating water from the primary circuit, as well as auxiliary circuits ensuring the extraction of the residual power on shut down and in the case of the ship capsizing. Thus, these reactors are too complex and costly to be used for the local production of electricity or heat according to the invention.

The present invention specifically relates to a pressurized water nuclear reactor of an original design and which is particularly simple, fulfilling all the imposed safety conditions, particularly in the case of capsizing, without having recourse to any auxiliary standby cooling circuit, whereby said reactor is also autopressurized and operates on a natural circulation basis, which makes it possible to eliminate the heating members of the pressurizer and the primary pumps indispensable in existing reactors.

SUMMARY OF THE INVENTION

The present invention therefore specifically relates to a pressurized nuclear reactor with circulation by natural convection, comprising a main vessel filled with water surmounted by a pressurized steam layer, said vessel containing in the lower part the reactor core and in the upper part a steam generator, internal structures channelling the circulation of water between the core and the steam generator, a confinement enclosure externally duplicating the main vessel and defining with the latter an intermediate space, wherein the main vessel is not thermally insulated, the intermediate space having an upper zone filled with pressurized neutral gas, an intermediate zone filled with water and communicating with the upper zone and defined between the enclosure and a thin ferrule sealingly connecting the confinement enclosure to the vessel, above the reactor core and a lower zone filled with water and defined between the thin ferrule, the vessel and the enclosure, the confinement enclosure being immersed in an external cooling liquid such as water and internally equipped with thermal insulation in the lower zone of the intermediate space, except in a lower part of the confinement enclosure located at a level below the reactor core.

This special design of the main vessel, confinement enclosure and intermediate space defined between these two components makes it possible to limit thermal leaks to a minimum value during the normal operation of the reactor and to bring about a short term evacuation of the residual power dissipated in the reactor core, no matter what the slope of the latter, when power extraction by the secondary circuit of the steam generator is stopped. Thus, a nuclear reactor is obtained without any auxiliary circuit, requiring no continuous monitoring, able to function without intervention during the use period of the core and usable in an intrinsically safe manner in all cases where it is possible to ensure that the confinement enclosure remains immersed in the external cooling liquid.

In a preferred embodiment of the invention, the upper zone of the intermediate space is formed in a spherical upper part of the confinement enclosure. This particular shape aids the condensation of the steam formed by the boiling of the water in the intermediate zone during low power operation of the reactor, the extraction of power by the secondary circuit being stopped.

In this preferred embodiment, outside the spherical upper part of the confinement enclosure, the main vessel and the confinement enclosure have a cylindrical configuration centered on a common vertical axis, the thin ferrule also having a cylindrical configuration centred on said axis and being fixed by its upper end to the confinement enclosure, at the bottom of the spherical upper part and by its lower end to the main vessel.

Preferably, pressure balancing means are provided between the lower zone and the upper and intermediate zones of the intermediate space. These means can be constituted by a swanneck tube projecting upwards into the intermediate zone from the thin ferrule.

According to another interesting aspect of the invention, the main vessel also contains an annular reflector surrounding the reactor core, said reflector being formed from several separate sectors, normally positioned level with the core, each sector being able to move upwards with the aid of elastic means during an inclination of the reactor exceeding a given angle, e.g. approximately 60°. If the ship capsizes, this feature makes it possible to ensure the smothering of the power dissipated by the reactor by introducing antireactivity into the latter. Thus, it is possible to compensate the fact that under these conditions that it is not possible for absorbing elements to drop or dropping cannot be completed.

According to another feature of the invention, the main vessel contains at least one system of absorbing elements able to move in guide tubes provided in the reactor core during the actuation of the control means outside the vessel, said control means creating a rotary movement transmitted to a threaded rod located in the vessel and on which is mounted a nut carrying said system, via a mechanism comprising a magnetic coupler ensuring the transmission of the rotary movement through the vessel.

These control means can also be outside the confinement enclosure. In this case, a second magnetic coupler is disposed on the confinement enclosure to ensure the transmission of the rotary movement through the latter. Means within the vessel are provided in this case to automatically disconnect said system of absorbing elements from the nut when the pressure in the vessel exceeds a given pressure and when the level of the water in the vessel drops below a given level.

It is also possible to consider a manual dropping of the system of absorbing elements by means of a tube connecting the upper part of the vessel to the outside of the enclosure and permitting the pressure in the vessel to rise by injecting gases. This tube can also be used for injecting boron or any other soluble nuclear poison. This tube, equipped with a burster disk, is normally closed by sealing means.

As the reactor core has an active part of given height, the guides preferably project beyond said active parts downwards by half said height and upwards by the equivalent of said height.

The absorbing elements then have a length equal to one and a half times the height of the active part of the core, one half of the elements being absorbing over their entire length and the other half being absorbing over the upper two thirds of their length.

BRIEF DESCRIPTION OF THE DRAWINGS

The invention is described in greater detail hereinafter relative to non-limitative embodiments and the attached drawings, wherein show:

FIG. 2 A vertical sectional view diagrammatically showing the arrangement of the reflector surrounding the reactor core shown on FIG. 1.

FIG. 3 A vertical sectional view showing diagrammatically and on a larger scale the swanneck tube ensuring the pressure balancing between the lower and intermediate zones of the intermediate space formed between the vessel and enclosure of the reactor of FIG. 1.

DETAILED DESCRIPTION OF THE PREFERRED EMBODIMENTS

Figure 1:
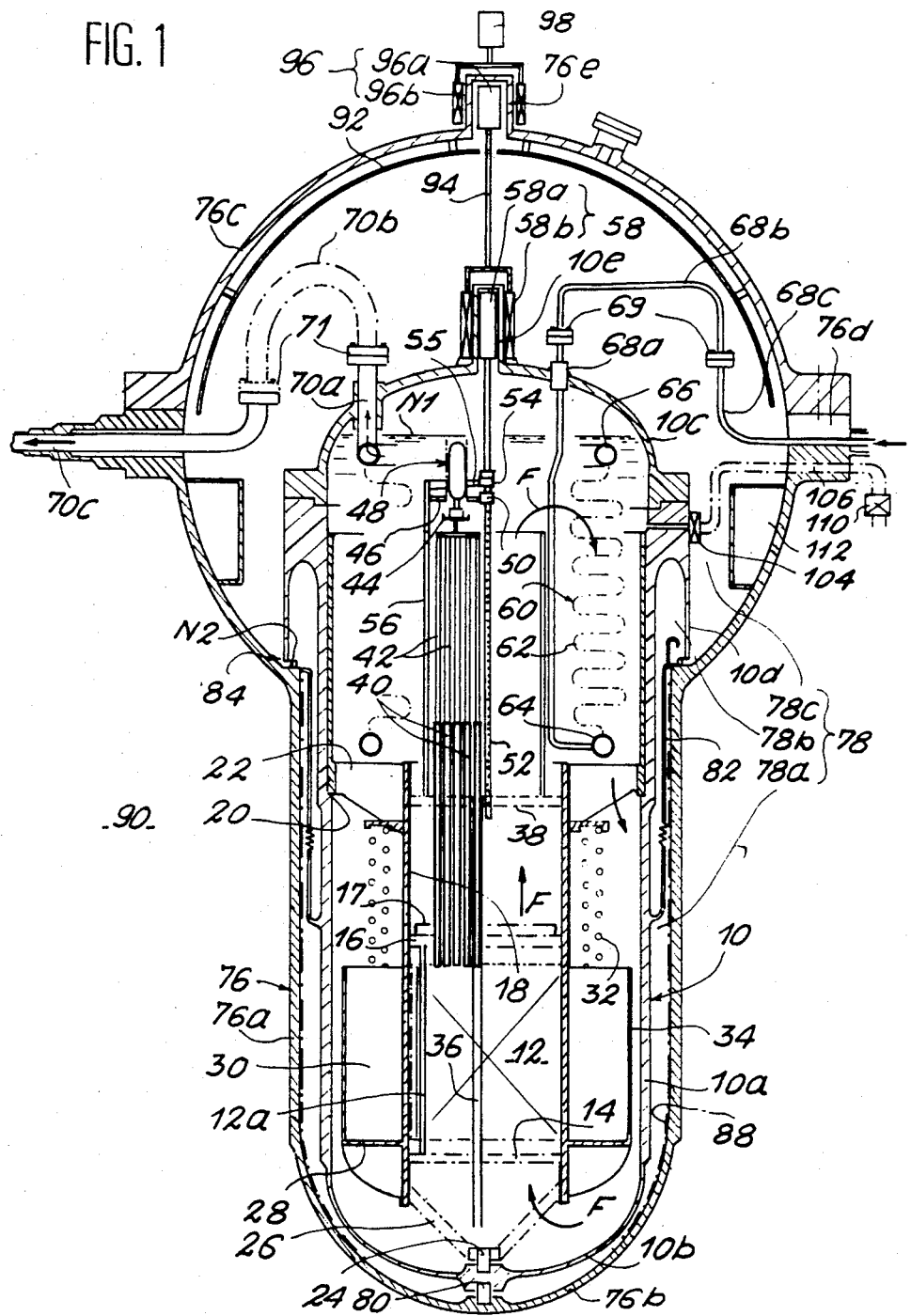
FIG. 1 A vertical sectional view diagrammatically illustrating the boiler of a small pressurized water nuclear reactor constructed according to the invention.

The boiler of the pressurized water nuclear reactor shown in FIG. 1 comprises a main vessel 10 within which is sealingly confined the primary circuit of the reactor. This main vessel 10 has a cylindrical wall of revolution 10a normally centred on a vertical axis. Wall 10a is extended at its lower end by a hemispherical base 10b. Vessel 10 is closed at its upper end by a hemispherical cover 10c, which is fixed to a flange forming the upper edge of wall 10a by means of dismantlable fixing means, such as not shown studs.

According to a major feature of the invention, the main vessel 10 is not thermally insulated and is externally duplicated or clad by a confinement enclosure 76 defining an intermediate space 78 with vessel 10.

Confinement enclosure 76 has a symmetry of revolution about a vertical axis coinciding with the axis of vessel 10. More specifically, enclosure 76 comprises a cylindrical wall of revolution 76a surrounding over most of its height the wall 10a of the vessel, with the exception of the upper part of said wall. Below wall 76a, enclosure 76 is extended by a base 76b externally duplicating the vessel base 10b. Finally, side wall 76a is extended upwards by a spherical wall 76c. The upper hemisphere of wall 76c constitutes a cover fixed in dismantlable manner, e.g. by means of studs, to a flange 76d constituting the larger diameter upper edge of the lower hemisphere of said same wall 76c.

As illustrated in FIG. 1, vessel 10 rests by a cylindrical ferrule 10d on an annular rim internally defining the junction between cylindrical wall 76a and the spherical wall 76c of the confinement enclosure. Said ferrule 10d is joined by its upper end to the flange formed at the upper end of the wall 10a, so as to define an annular space with the latter. At its lower end, vessel 10 is also centred with respect to enclosure 76 by a pin 80 disposed along the common axis thereof and received in appropriately shaped recesses in their respective bases 10b and 76b.

Reactor core 12 is located in the lower part of vessel 10 and in accordance with the vertical axis thereof. It is formed from fuel rods such as 12a, identical to those used in conventional electrogenic reactor and positioned in a vertical manner. The central active part of the thus formed core 10 is indicated by a cross in FIG. 1. Rods 10a are supported by a lower horizontal core grid 14 perforated with a triangular spacing by water passage holes having a diameter larger than that of the rods, as well as blind holes serving to receive the maintaining ends extending the fuel rods at their lower end. In the upper part of the core, the spacing between rods 10a is maintained by a first intermediate horizontal grid 16, perforated in an identical manner to the lower grid 14, except that the blind holes are replaced by traversing holes permitting the fitting and removal of the rods.

A second intermediate horizontal grid 17 is placed immediately above grid 16 and also has water passage holes, but has no holes above the upper ends of the rods. During the installation of rods 10a, grid 17 is not fixed and can slide slightly upwards.

During installation (which takes place outside vessel 10) rods 12a are introduced from the bottom through the water passage holes formed in the lower grid 14. When the upper end fitting thereof is received in the corresponding hole of the first intermediate grid 16, the rods are still displaced upwards by a small distance, whilst removing the second intermediate grid 17, so as to free their lower ends from the water passage holes of grid 14, in order to introduce them into the blind holes of the same grid. Rods 12 a are then put into place. Their securing in the case of an impact or capsizing is then ensured by fixing grid 17 to grid 16.

Grids 14 and 16 are fixed at their peripherary to a cylindrical ferrule of revolution 18, whose vertical axis coincides with the vessel axis. Ferrule 18 surrounds reactor core 12 and is vertically extended in the upwards direction, so as to separate the relatively hot upward water flow leaving the core from the relatively cool downward water flow returning to the core and as will be shown hereinafter.

Ferrule 18 rests on a shoulder formed within the cylindrical wall 10a of the vessel, by an annular member 20 connected to the upper end of ferrule 18 by vertical plates 22 radially oriented with respect to the vessel axis.

At its lower end, ferrule 18 is centered on the vessel bottom 10b by a pin 24 connected to the lower end of ferrule 18 by oblique arms 26 and received in an appropriately shaped recess in the bottom of the vessel in accordance with the vertical axis thereof. Around its lower end, ferrule 18 is provided with a horizontal annular support 28, whose outer edge is extended upwards by a cylindrical ferrule of revolution 34 over the entire height of the active part of the core.

As illustrated in FIG. 2, an annular reflector 30 is positioned around the core in the annular space formed between ferrules 18 and 34. Reflector 30 normally rests on support 28. Preferably, it is divided over its entire peripherary into several sectors of equal sizes able to move vertically independently of one another. More specifically, each of the sectors of reflector 30 can move vertically upwards with the aid of a suspension spring 32 interposed between the upper face of said reflector sector and a horizontal annular plate 33 positioned above the latter.

Plate 33 can in particular be supported by vertical plates 22, as illustrated in FIG. 2. Grids 14, 16 supporting fuel rods constituting reactor core 12 also support vertical guide tubes 36, whereof only one is shown in FIG. 1, in order to facilitate the understanding of the latter. If h is the height of the active part of reactor core 12, the guide tubes 36 exceed said height 0.5 times downwards and once upwards.

In order to ensure the positioning of guide tubes 36 at the upper ends thereof, said end is fixed to a horizontal upper grid 38 which is extensively perforated and peripherally fixed to the ferrule 18.

Guide tubes 36 are arranged so as to ensure the vertical sliding guidance of the rods or absorbing elements 40, which are also vertically disposed in vessel 10. These absorbing elements 40 are extended upwards by smaller diameter vertical rods 42, e.g. combined in three groups with three absorbing heads 44 in order to form a system of absorbing elements. For simplification purposes, only one of these systems is shown in FIG. 1.

The length of each absorbing element 40 is preferably equal to one and a half times the height h of the active part of core 12. Moreover, approximately half the absorbing elements 40 of each of the systems are absorbing over their entire length, whereas the other half of said absorbing elements are only absorbing over the upper two thirds of their length. The head 44 of each of the systems of absorbing elements is suspended on a horizontal arm 46 radially oriented with respect to the vessel axis by means of a float gripper 48, which is constructed in the same way as described and claimed in French patent application 8517594 filed on 28 Nov. 1985 by the Commissariat a l'Energie Atomique. It makes it possible to ensure the automatic dropping of the systems of absorbing elements, both when level $N_1$ of the water within the vessel remains below the minimum acceptable level and when the pressure within the vessel exceeds a maximum acceptable pressure. Under normal reactor operating conditions, the floats of the float grippers 48 are normally located below level $N_1$, so that the systems of absorbing elements remain attached to said grippers.

The arms 46 ensuring the supporting of the systems of absorbing elements 40 are fixed to a nut 50 screwed to a threaded rod 52 disposed in accordance with the vertical axis of the vessel.

Threaded rod 52 is supported in rotary manner and centred within the vessel by a central abutment 54, which is itself connected by radially oriented horizontal arms 55 to the upper end of a cylindrical ferrule of revolution 56, whose axis coincides with the vertical axis of vessel 10. The lower end of ferrule 56 rests on grid 38. Apart from its function of supporting abutment 54, in the upper part of vessel 10 ferrule 56 fulfils the same function as ferrule 18 in the lower part, i.e. it separates the rising and falling flows of the primary circuit water. Ferrule 56 also supports vertical rails along which are guided the arms 46 during their vertical displacement. At its lower end, threaded rod 52 is received in a hole formed in the centre of grid 38 and making it possible to limit the lateral displacement thereof.

Threaded rod 52 is extended upwards beyond abutment 54, in order to be joined to the led internal magnetic rotor 58a of the magnetic coupler 58 making it possible to rotate the threaded rod 52 through the wall of vessel cover 10c without breaking the seal of the latter. To this end, internal rotor 58a is received in a glove finger projection 10e formed along the vertical axis of cover 10c. Magnetic coupler 58 also comprises a leading outer magnetic rotor 58b positioned around rotor 58a, externally of the glove finger projection 10e.

Rotor 58b is fixed to the lower end of a linkage 94 arranged along the common axis of the vessel and the enclosure and whose upper end is fixed to the led internal magnetic rotor 96a of a second magnetic coupler 96 making it possible to transmit the rotary movement through the upper wall 76c of the enclosure. To this end, inner rotor 96a is placed in a glove finger projection 76e of wall 76c and magnetic coupler 96 comprises a leading outer magnetic rotor 96b placed outside the projection and around inner rotor 96a. The rotation of the outer rotor 96b is controlled by a servomotor 98 acting on the outer rotor by an appropriate linkage.

Servomotor 98 constitutes the sole external regulating device of the primary circuit. By modifying the reactivity in the core, it makes it possible to maintain the pressure of the circuit within desired limits.

To complete the description of the components of the primary circuit located within the main vessel 10, FIG. 1 shows an annular steam generator 60 in the upper part of vessel 10 between wall 10a and ferrule 56. Steam generator 60 is of the single pass, superheating type. It is formed from two rows of helically wound tubes 62, which are imbricated, but independent.

At their lower end, tubes 62 are welded to two semi-toroidal feed water collectors 64 and at their upper end to two semi-toroidal steam collectors 66. The feed water collectors 64 are located immediately above radial plates 22, whereas the steam collectors 66 are located just below the free surface of the water contained in main vessel 10.

Not shown plugs are generally located in collector 64 facing each of the tubes 62, in order to permit the fitting of foot diaphragms and the subsequent inspection of the tubes. In a comparable manner, plugs are generally installed facing tubes 62 in the two steam collectors 66, in order to facilitate the passage of an inspection probe and permit the possible sealing of a defective tube.

Preferably, the steam generator 60 is installed so as to give tube 62 the necessary flexibility, so that in normal operation they are still subject to compressive stresses. Under these conditions, any local crack has a tendency to close again and not reduce the resistance of the tube to buckling, so that such a crack can only lead to a microleak. However the internal pressurization of the tubes during a maintenance operation can instantaneously reveal such faults.

The arrival of feed water from the secondary circuit in collector 64 takes place by two vertical tubes 68a sealingly traversing the vessel cover 10c. In the same way, the removal of the steam which enters collector 66 takes place by means of two vertical tubes 78a also sealingly traversing the cover 10c of the main vessel.

Above the vessel cover 10c, tubes 68a are connected to bent tubes 68b located in intermediate space 78. At their opposite end, these bent tubes 68b are connected to water supply tubes 68c traversing in a horizontal and sealed manner the flange 76d formed in the larger diameter part of the spherical wall 76c of the enclosure. Tubes 68a, 68b and 68c are interconnected by tight, dismantlable connections 69.

In a comparable manner, the vertical steam discharge tubes 70a are connected to the bent tubes 70b situated in the intermediate space 78. At their opposite end, tubes 70b are connected to tubes 70c horizontally and sealingly traversing flange 76d. Tight, dismantlable connections 71 are interposed between tubes 70a, 70b and 70c. The bent tubes 68b and 70b located in intermediate space 78 make it possible to absorb differential expansions.

The water contained in the reactor vessel is surmounted by a steam layer obtained by placing under vacuum after sealing cover 10c. The heating members of the pressurizer used in the existing reactors can consequently be eliminated.

Level $N_1$ of the water within the vessel is normally above the upper edge of ferrule 56, so as to permit the circulation of the water above said ferrule without any pressure drop. Moreover, ferrule 56 is also provided with not shown holes along the superheating zone of steam generator 60, so as to permit the free passage of water at said level.

Under normal reactor operating conditions, a circulation of the water contained in main vessel 10 takes place by natural convection in the direction of arrows F in FIG. 1. Thus, the relatively hot water leaving the upper part of the reactor core 12 flows upwards in the central part of the vessel being channelled by ferrule 18 and then ferrule 56. Above the upper edge of the latter, there is a 180° direction change of the water, which then drops again into the annular zone defined between the side wall 10 of the vessel and ferrules 56 and 18.

On traversing the upper part of said annular zone, the water of the primary circuits circulates around the tubes 62 of steam generator 60, which has the effect of transferring to the feed water of the secondary circuit the heat transported by the water of the primary circuit. On cooling, the latter reheats the feed water of the secondary circuit to bring it to boiling. In the bottom of vessel 10, the water of the primary circuit again makes a 180° direction change in order to clear the lower edge of ferrule 18 and rise within the latter, again traversing reactor core 12.

According to the invention, a generally cylindrical thin ferrule 82 having a vertical axis coinciding with the axes of the vessel and the enclosure is positioned between the cylindrical walls 10a and 76a of the latter above the upper level of core 12. The term thin ferrule is understood to mean a ferrule, whose thickness is such that sealing is obtained between intermediate zones 78a, 78b without having to resist a pressure difference.

More specifically, the upper edge of ferrule 82 is sealingly connected to enclosure 76 level with the upper end of side wall 76a of the latter. Moreover, the lower edge of ferrule 82 is sealingly connected to the vessel side wall 10a at a level just above that of intermediate grids 16, 17.

In the inventive configuration described hereinbefore, space 78 formed between the vessel and the enclosure comprises a lower zone 78a defined between vessel 10 and enclosure 76 below ferrule 82, an intermediate zone 78b defined between ferrule 82, ferrule 10d and the top of the vessel wall 10a and an upper zone 78c defined between the spherical part 76c of the enclosure and the upper end of the vessel.

According to the invention, the lower zone 78a is filled with water, normally in the liquid state under the normal operating conditions of the reactor. The intermediate zone 78b is also filled with water to level $N_2$ approximately level with the connection of the thin ferrule 82 to enclosure 76. The water contained in zone 78b is surmounted by a neutral gas, such as pressurized argon, which communicates with the pressurized argon contained in the upper zone 78c via passages 84 formed at the bottom of ferrule 10b ensuring the supporting of the vessel. For example, an outlet temperature from the steam generator of approximately 210° C. gives a neutral gas pressure in zones 78b and 78c of close to 19 bars.

As more specifically illustrated in FIG. 3, in order to ensure the pressure balancing between lower zone 78a and the intermediate and upper zones 78b, 78c, whilst still preventing any emptying or draining of lower zone 78a, even in the case of a slope or overturning of the reactor, a swanneck tube 86 is connected to the upper edge of ferrule 82, whilst projecting upwards into intermediate zone 78b. Moreover, enclosure 76 is internally equipped with thermal insulation 88 over the entire cylindrical wall 76a and the upper wall of bottom 76b. However, vessel 10 is not thermally insulated. Finally, enclosure 76 is wholly or partly immersed in an external cooling liquid 90, which can be sea or river water.

The thermal insulation 88 is designed and dimensioned in such a way that the thermal leaks are small during normal reactor operation, whilst still being adequate to evacuate the residual power, no matter what the orientation of the reactor, when the extraction of power by the secondary circuit is stopped.

The neutral gas pressure in upper zone 78c and intermediate zone 78b is determined in order to ensure the non-boiling of the water contained in zones 78a, 78b under normal reactor operating conditions, i.e. when the not shown pumps of the secondary circuit function normally.

During a stoppage of the pumps of the secondary circuit, the reactor core continues to dissipate a certain residual power leading to an increase in the temperature of the water contained in the vessel. This temperature rise leads to the boiling of the water contained in intermediate and lower zones 78b, 78a. In the latter zone, thermal insulation 88 is dimensioned in such a way that the thus formed steam condenses on the upper part of cylindrical wall 76a under the effect of the heat exchange with the outer water 90.

In a comparable manner, the steam formed in intermediate zone 78b enters upper zone 78c by passages 84, where it is condensed on spherical wall 76c in order to drop again into the intermediate zone in liquid form. In order to channel the water condensed on wall 76c, the latter is internally duplicated or clad by a hemispherical partition 92 over its upper hemisphere forming a cover. Moreover, the feed water supply tubes 68b in zone 78c ensure a certain condensation of the vapour formed in said zone.

As a result of these features, the discharge of the residual power of the reactor on shut down is automatically ensured, even if the secondary circuit is not available.

If the reactor slopes, the useful exchange surface between the main vessel 10 and the water contained in intermediate zone 78b drops until it disappears completely in the horizontal position.

Conversely, in the lower zone 78a, the increase in the slope of the reactor has the effect of progressively bringing the steam formed in said zone into contact with the non-thermally insulated part of the enclosure base 76b. The heat exchange ensuring the cooling of said lower zone 78a consequently significantly increases with the slope of the reactor.

A burster disk 104 can be placed in a tube 106 issuing into vessel 10 immediately below cover 10c and connecting the interior of the vessel to the outside of enclosure 76 after traversing flange 76d formed in the larger diameter part of the spherical wall 76c of the enclosure. Tube 106 is normally closed by a tap and a plug 110. Disk 104 is regulated so that it only tears in the case of an overpressure with respect to the vessel. In the case of a blockage of the control mechanism of absorbing elements 40 and the need for a return to cold conditions, it makes it possible to inject nitrogen, so as to bring about the disengagement and the dropping of the absorbing elements under the effect of a pressure rise within the vessel.

An instrumentation box 112 is also installed in the upper zone 78c below flange 76d. This box contains sensors, such as pressure sensors and sensors for the level of the water in the vessel and enclosure, together with heat sensors and the like. This makes it possible to maintain these sensors at a local ambient temperature which is as low as possible and to position them in an area not affected by the removal of the enclosure cover permitting the dismantling of the internal structures of the vessel when it is necessary to replace the core.

In this case, after removing the cover formed by the upper hemisphere of wall 76c, the feed water and steam connecting tubes 68b and 70b respectively of the secondary circuit are dismantled, as is linkage 94. The vessel cover 10c can then be removed and the internal structures are removed from the vessel and replaced by new structures. After putting the cover 10 into place, the air of the vessel is pumped by placing under vacuum, which makes it possible to obtain a steam layer permitting the operation of the reactor in autopressurized manner, the circulation of the primary circuit water taking place by natural convection, as described hereinbefore.

Under normal operating conditions, the extraction of the heat produced in core 12 towards the use point is ensured by the water circulating in the secondary circuit. Apart from the aforementioned pumps, said circuit has regulating valves in tubes 68c. Thermal leaks are normally limited by the thermal insulation 88 internally lining the cylindrical wall 76a of the enclosure. Under these conditions, there is no boiling of the water in zones 78a, 78b.

During a stoppage of the pumps of the secondary circuit, the reactor core 12 continues to dissipate a certain residual power. The heating of the primary circuit water resulting therefrom leads to the boiling of the water in zones 78a, 78b. As stated hereinbefore, the dimensioning of the thermal insulation 88 is then such that it ensures an adequate cooling by the external liquid 90 to condense the steam formed between ferrules 82 and wall 76a in the lower zone 78a. In the same way, the steam formed in intermediate zone 78b escapes by passages 84 into the upper zone 78c, where it condenses on wall 76c, under the effect of the cooling ensured by the external liquid 90.

When a sloping of the reactor takes place, the water contained in the intermediate space 78b escapes towards the upper space 78c, so that these two zones no longer ensure the cooling of the primary circuit. However, the vapour which continues to form in lower zone 78a then comes into contact with the non-thermally insulated bottom of enclosure 76, said contact increasing in proportion to the slope of the vessel. The condensation of the vapour formed consequently increases substantially with the slope, so that the effectiveness of the cooling of the primary circuit by the water contained in the lower zone 78a increases as the reactor slope increases.

The residual power dissipated into the core can then be evacuated, no matter what the reactor slope. Moreover, the power dissipated in the reactor core is smothered during a rise in the primary pressure or a drop in the level $N_1$ of the water contained in the vessel through the automatic dropping of the system of absorbing elements controlled by devices 48.

If no such smothering takes place or is only of a partial nature, due to the slope of the reactor, the particular construction of the annular reflector 30 makes it possible to automatically introduce supplementary antireactivity into the core, under the effect of the upward displacement of one or more annular sectors of said reflector resulting from a slope of the vessel beyond approximately 60°.

Obviously, the invention is not limited to the embodiment described in exemplified manner hereinbefore and covers all variants thereof. In particular, the structures of the core and steam generator can be substantially modified without leaving the scope of the invention. Moreover, all the special arrangements provided for maintaining the security of the reactor in the case of capsizing can be eliminated when there is no such risk. Thus, a conventional reflector can then be placed around the reactor core. Moreover, the control servomotor 98 can be placed in zone 78c outside vessel 10. Magnetic coupler 96 is then eliminated.

What is claimed is:

1. A pressurized nuclear reactor with circulation by natural convection, comprising: a main vessel adapted to be filled with water and to be surmounted by a pressurized steam layer, said vessel containing in a lower part thereof a reactor core and in an upper part thereof a steam generator, a first ferrule surrounding the reactor core and a second ferrule located within the steam generator, said ferrules adapted to channel water between the core and the steam generator, a confinement enclosure externally duplicating the main vessel and defining with the latter an intermediate space, the main vessel being thermally uninsulated, the intermediate space having an upper zone adapted to be filled with pressurized neutral gas, an intermediate zone adapted to be filled with water and communicating with the upper zone and defined between the enclosure and a fluid-tight ferrule sealingly connecting the confinement enclosure to the vessel, above the reactor core, and a lower zone adapted to be filled with water and defined between the fluid-tight ferrule, the vessel and the enclosure, the confinement enclosure being adapted to be immersed in an external cooling liquid and internally equipped with thermal insulation in the lower zone of the intermediate space, except in a lower part of the confinement enclosure located at a level below the reactor core.

2. A nuclear reactor according to claim 1, wherein in the upper zone of the intermediate space is formed in a spherical upper part of the confinement enclosure.

3. A nuclear reactor according to claim 2, wherein, outside the upper spherical part of the confinement enclosure, the main vessel and confinement enclosure have a cylindrical configuration centered on a common vertical axis, said fluid-tight ferrule also having a cylindrical configuration centered on said axis and having an upper end fixed to the confinement enclosure at a bottom of said upper spherical part and having a lower end fixed to the main vessel.

4. A nuclear reactor according to claim 1, wherein pressure balancing means are provided between the lower zone and the upper and intermediate zones of the intermediate space.

5. A nuclear reactor according to claim 4, wherein said pressure balancing means comprise a swanneck tube projecting upwards into the intermediate zone from the fluid-tight ferrule.

6. A nuclear reactor according to claim 1, wherein the main vessel also contains an annular reflector surrounding the reactor core, said reflector being formed from several separate sectors normally located level with the core, each sector being able to move upwards with the aid of elastic means during a slope of the reactor exceeding a given angle.

7. A nuclear reactor according to claim 1, wherein the main vessel contains at least one system of absorbing elements able to move in guides provided in the reactor core during operation of control means outside the main vessel, said control means creating a rotary movement transmitted to a threaded rod located in the vessel and on which is mounted a nut carrying said system, via a mechanism incorporating at least one magnetic coupler ensuring transmission of the rotary movement through the vessel.

8. A nuclear reactor according to claim 7, wherein the control means are placed outside the confinement enclosure, said mechanism incorporating a second coupler ensuring transmission of the rotary movement through the confinement enclosure.

9. A nuclear reactor according to claim 7, wherein means are provided for automatically disconnecting said system from the nut when the pressure in the vessel exceeds a given pressure and when the water level in the vessel drops below a given level.

10. A nuclear reactor according to claim 9, wherein a tube connects the upper part of the vessel to the outside of the enclosure, said tube being equipped with a burster disk and normally closed by sealing means.

11. A nuclear reactor according to claim 7, wherein the reactor core has an active part of given height h, the guides passing beyond said active part by half said height h in downwards direction and once said height h in upwards direction.

12. A nuclear reactor according to claim 11, wherein the absorbing elements have a length equal to one and a half times the height h of the active part of the core, half said elements being absorbing over their entire length and the other half being absorbing over the upper two thirds of their length.

* * * * *